United States Patent
Zang et al.

(10) Patent No.: US 8,413,234 B1
(45) Date of Patent: Apr. 2, 2013

(54) COMMUNICATIONS-SERVICE FRAUD DETECTION USING SPECIAL SOCIAL CONNECTION

(75) Inventors: Hui Zang, Cupertino, CA (US); Travis E. Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 307 days.

(21) Appl. No.: 12/775,579

(22) Filed: May 7, 2010

Related U.S. Application Data

(63) Continuation-in-part of application No. 12/706,864, filed on Feb. 17, 2010.

(51) Int. Cl.
*H04L 29/06* (2006.01)
(52) U.S. Cl. .......................................... 726/22
(58) Field of Classification Search ........................ None
See application file for complete search history.

(56) References Cited

U.S. PATENT DOCUMENTS

| | | | |
|---|---|---|---|
| 6,208,720 B1* | 3/2001 | Curtis et al. | 379/114.14 |
| 7,236,954 B1* | 6/2007 | Marchand et al. | 705/37 |
| 2003/0110385 A1* | 6/2003 | Golobrodsky et al. | 713/188 |

* cited by examiner

*Primary Examiner* — David Pearson

(57) ABSTRACT

A method, system, and medium are provided for detecting fraud, the method comprising: initializing a fraud hypothesis variable associated with a communications device, receiving data that describes a plurality of outgoing communication records that are associated with said communications device, wherein the data is related to activity that took place over a given period of time, extracting a plurality of destination identifiers from said plurality of communication records, for each of at least a portion of said plurality of destination identifiers, modifying said fraud hypothesis variable based on a fraud metric associated with said destination identifier, comparing said fraud hypothesis variable to a first predetermined threshold, and when said fraud hypothesis variable exceeds said first predetermined threshold, generating a fraud indication that is related to said communications device.

20 Claims, 7 Drawing Sheets

COMMUNICATIONS-SERVICE FRAUD DETECTION USING SPECIAL SOCIAL CONNECTION

CROSS-REFERENCE TO RELATED APPLICATION

This Application claims priority to and is a Continuation-in-Part of U.S. patent application Ser. No. 12/706,864, filed on Feb. 17, 2010 and entitled "Telecom Fraud Using Social Pattern," the disclosure of which is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In one aspect, destinations that are frequently connected to by fraudulent devices are classified as fraudulent destinations. In another aspect, a set of computer-useable instructions provide a method for detecting fraudulent use of mobile devices in a wireless telecommunications environment. Devices that frequently connect to fraudulent destinations are classified as fraudulent devices. In a third aspect, the methods embodied by the previous aspects are incorporated into a system for detecting fraud in a wireless telecommunications device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| ESN | Electronic Serial Number |
| FP | False Positive |
| IP | Internet Protocol |
| SMS | Simple Messaging Service |
| TP | True Positive |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more nontransitory computer-readable media. Computer-readable media include both volatile and nonvolatile media, removable and nonremovable media, and contemplates media readable by a database, a switch, and various other network devices. By way of example, and not limitation, computer-readable media comprise media implemented in any non-transitory method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently.

Figure 1A:
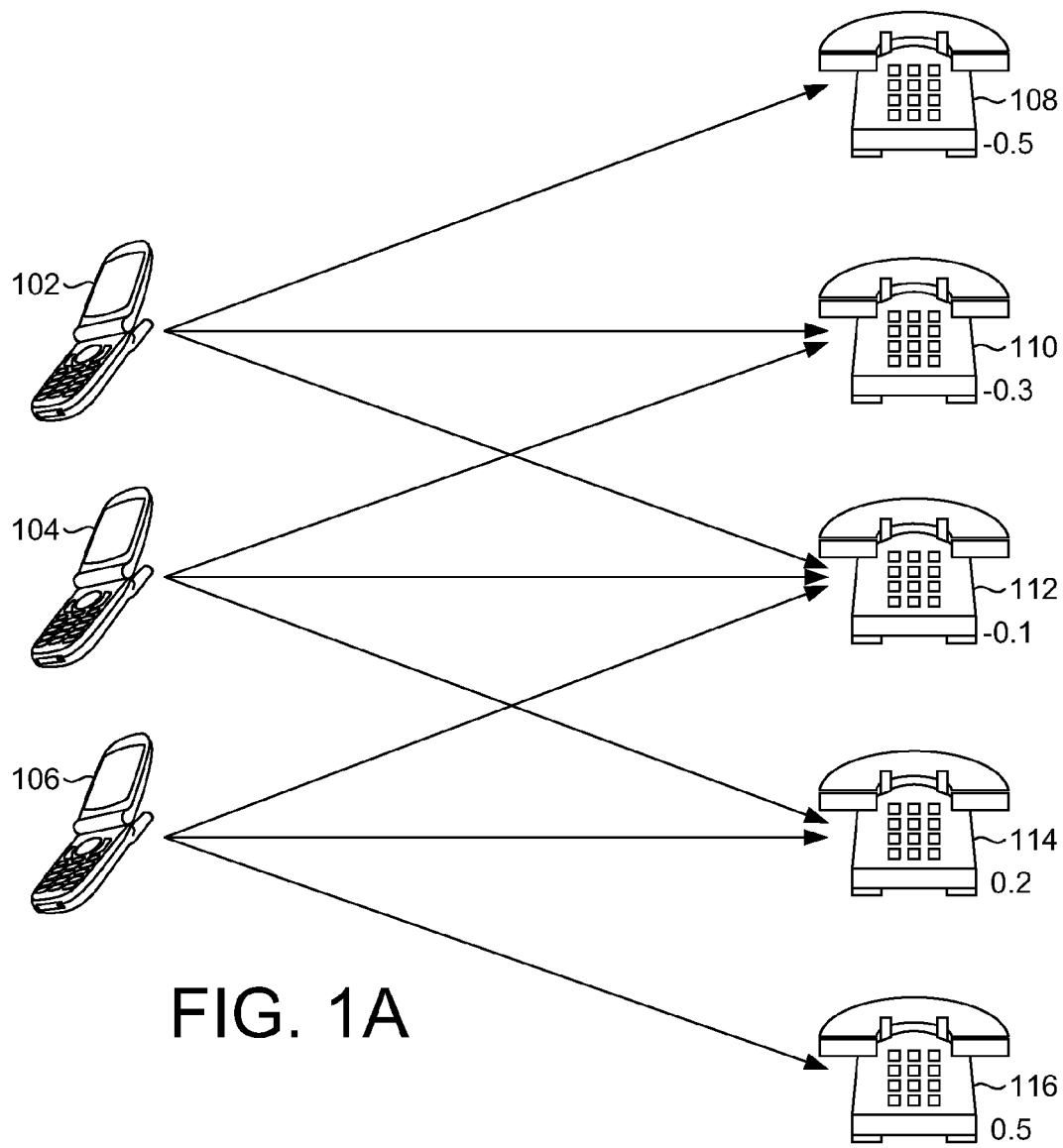
FIG. 1a depicts an illustrative diagram showing the destination identifiers associated with certain mobile communications devices in accordance with an embodiment of the present invention.

Turning now to FIG. 1A, an illustrative example showing the destination identifiers associated with certain mobile communications devices in accordance with an embodiment of the present invention is presented. In one embodiment mobile communications devices 102, 104, and 106 are cellular telephones. In another embodiment, they are laptops communicating via cellular modems. Other communications devices are possible without departing from the scope of the claims below. Each of mobile communications devices 102, 104 and 106 communicates with one or more destination identifiers; shown in this example are five such destination identifiers, destination identifiers 108, 110, 112, 114, and 116. In one embodiment, these destination identifiers are ten-digit domestic telephone numbers. In another embodiment, these destination identifiers correspond to variable-length international telephone numbers. In a third embodiment, they may correspond to Internet Protocol (IP) addresses. Other forms for the destination identifier are possible without departing from the scope of the claims below.

Each destination identifier is associated with a fraud metric value. In this example, destination identifier 108 has fraud metric value −0.5, destination identifier 110 has fraud metric value −0.1, destination identifier 112 has fraud metric value 0.1, destination identifier 114 has fraud metric value 0.5, and destination identifier 116 has fraud metric value 0.5. In this example, mobile communications device 102 has initiated communication with destination identifiers 108, 110, and 112. Similarly, mobile communications device 104 has initiated communication with destination identifier 110, 112, and 114, and mobile communications device 106 has initiated communication with destination identifier 112, 114, and 116.

Figure 1B:
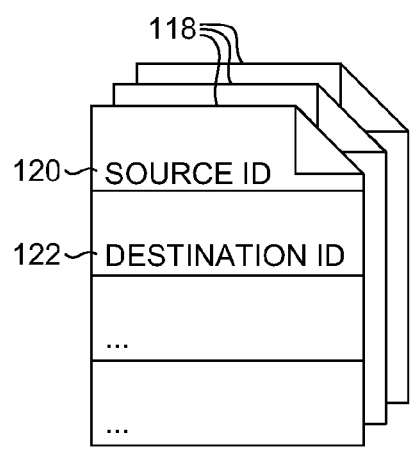
FIG. 1B depicts a series of exemplary records of a communications between a mobile communications device and a destination identifier such as those in FIG. 1A.

Corresponding to each of these communications is a communications record 118, as depicted in FIG. 1B. In some embodiments, each communication initiated by a mobile communications device to a given destination identifier is recorded separately; in other embodiments, only the fact that, e.g., mobile communications device 102 initiated communication with destination identifier 108 at least once is significant. Communications record 118 contains a plurality of fields, including a source identifier 120 and a destination identifier 122.

The form of these identifiers will vary depending on the form of the communication. For example, if the communication is a domestic phone call, then the identifiers may be ten-digit domestic telephone numbers. If the communication is an international phone call, the identifiers may be international phone numbers of variable length. If the communication is a data communication, the identifiers may be IP addresses. Furthermore, the source and destination identifiers may not be in analogous form; for example, the destination identifier may be a ten-digit phone number, while the source identifier is a Electronic Serial Number (ESN) corresponding to the account associated with the mobile device.

In many cases, these identifiers will be in hierarchical form, with the leading digits indicating a coarse identification and subsequent digits successively refining the identification. For example, in an international phone number such as +39 06 1234 5678, a first group of digits (here "39") indicate the country (Italy), a second group of digits (here "06") represent a city (Rome), and so on, until the whole number uniquely identifies an individual telephone subscriber. Similarly, IP addresses are divided up into a network part and a host part; for example, the 32-bit IP address 192.168.123.156 is divided into a 16-bit network part ("192.168") and a 16-bit host part ("123.156"), though other divisions of the 32 bits are possible.

Figure 2:
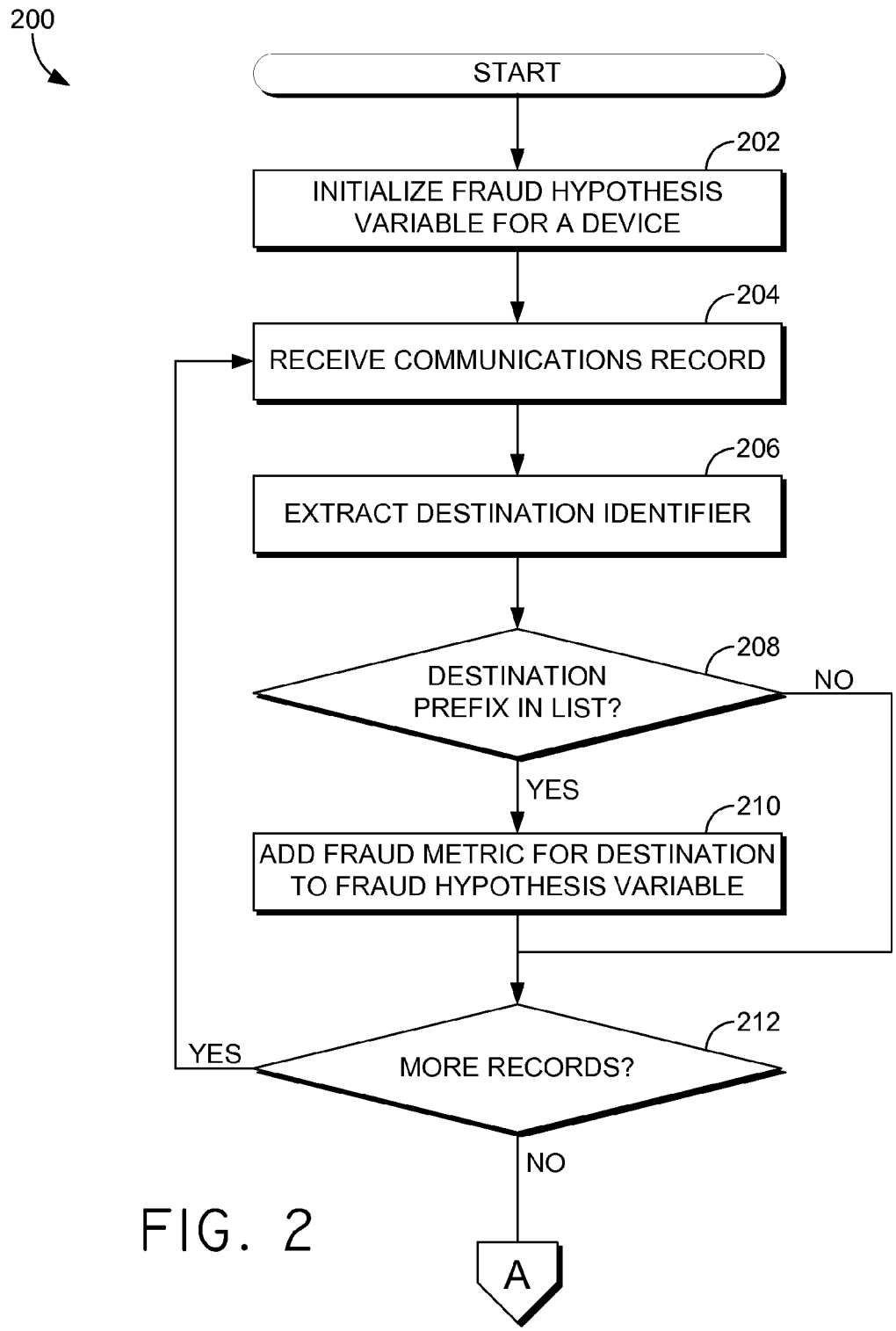
FIG. 2 depicts a flowchart for a method of detecting fraudulent mobile communications devices in accordance with one embodiment of one aspect of the present invention.
Figure 2:
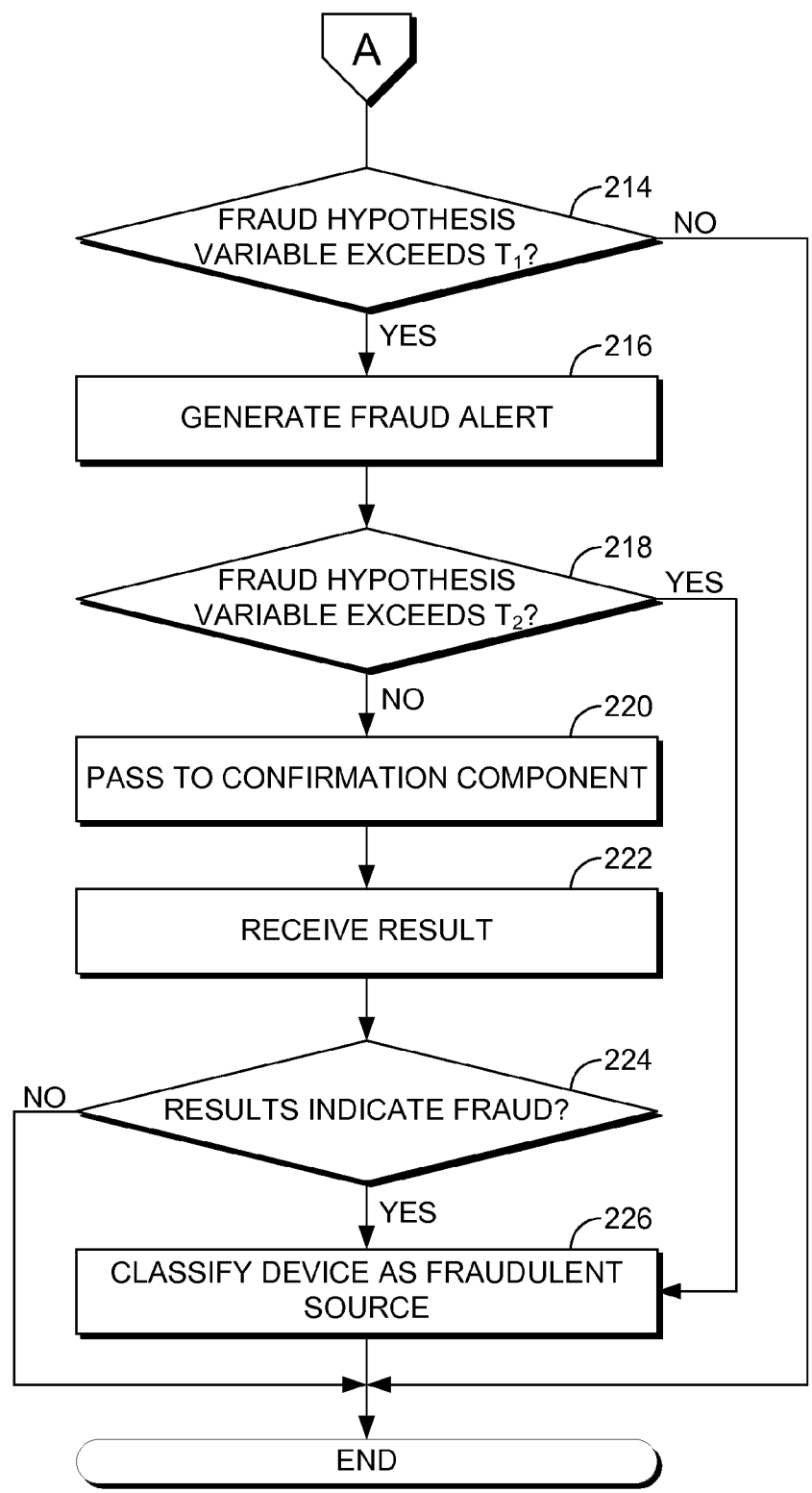

Turning now to FIG. 2, a flowchart for a method of detecting fraudulent mobile communications devices in accordance with one embodiment of one aspect of the present invention is presented and referenced generally by the numeral 200. At step 202, a fraud hypothesis variable associated with a mobile communications device is initiated. This fraud hypothesis variable represents the likelihood that the hypothesis that the associated mobile communications device is fraudulent is true. In some embodiments, a higher value for this variable indicates that the hypothesis is more likely to be true; in other embodiments, a lower value indicates that the hypothesis is more likely to be true. In one embodiment, this fraud hypothesis variable is initialized to 0; in another it is initialized to 0.5. In other embodiments, it may be initialized to other values without departing from the scope of the claims below.

At step 204, a communications record such as communications record 118 is received. In one embodiment, this communications record takes the form of a voice call record. In another embodiment, it takes the form of an SMS message. In a third embodiment, it takes the form of an indication of a data communication. Each communication record so received is related to activity that took place over a given period of time; in one embodiment, this period of time may correspond to a billing cycle; in another embodiment, this period of time corresponds to the previous day. Other time intervals are possible without departing from the scope of the claims below.

At step 206, a destination identifier is extracted from the communication record received in step 202. As previously discussed, this identifier takes a variety of forms in different embodiments, and in some embodiments will be hierarchically organized so as to include a prefix. In embodiments that do not include hierarchically organized destination identifiers, step 208 will be omitted and processing will proceed directly to step 210.

At step 208, a prefix from the destination identifier is compared to a list of prefixes. In one embodiment, the list of prefixes contains only top-level prefixes. In another embodiment, the list of prefixes contains variable-length prefixes. Other prefix-matching schemes are possible without departing from the scope of the claims below. If the prefix from the destination identifier matches a prefix in the prefix list, a fraud metric value associated with the destination identifier is used to modify the fraud hypothesis variable associated with the mobile communications device at step 210.

In one embodiment, this modification comprises adding the fraud metric value to the fraud hypothesis variable. In another embodiment, the modification comprises multiplying the fraud hypothesis variable by the fraud metric value. In yet another embodiment, the fraud hypothesis variable comprises an average of all fraud metric values encountered, and the modification comprises incorporating the fraud metric value associated with the destination identifier into that average. Other ways of modifying the fraud hypothesis variable using the fraud metric value associated with the destination identifier are possible without departing the scope of the claims below.

After this modification, or if the prefix does not match any prefix in the prefix list, the method continues to step 212. At step 212, it is determined whether more records remain to be processed for the given time period. If so, steps 204 et seq. are repeated until no records remain to be processed. Once no records remain, the method continues to step 214. At step 214, the fraud hypothesis variable is compared to the first threshold, denoted in FIG. 2 by $T_1$ to determine whether the fraud hypothesis is true. In one embodiment, a fraud hypothesis variable value greater than the first threshold indicates that the fraud hypothesis is true and that the mobile communications device is fraudulent. In another embodiment, a fraud hypothesis variable value less than the first threshold indicates that the fraud hypothesis is true. If the fraud hypothesis is determined to be true, a fraud alert associated with the mobile communications device is generated at step 216 and processing is continued at step 218. Otherwise, if the fraud hypothesis is false, processing terminates.

At step 218, the fraud hypothesis variable is compared to a second threshold, denoted in FIG. 2 by $T_2$. This second threshold represents a higher level of confidence that the fraud hypothesis is true. Thus, if the fraud hypothesis is confirmed when the fraud hypothesis is greater than the threshold value, then the second threshold is higher than the first threshold value. Conversely, if a fraud hypothesis variable value less than the first threshold confirms the fraud hypothesis, then the second threshold is less than the first threshold. If the fraud hypothesis is not confirmed at this higher confidence level, information regarding the mobile device is passed to the confirmation component at step 220.

In one embodiment, this confirmation takes the form of a review of the information by a human operator. In another embodiment it takes the form of further automated processing of the communications records associated with the mobile communications device by other methods. At step 222, the results of this confirmation are received from the confirmation component. At step 224, it is determined whether these results confirm the fraud hypothesis at the higher level of confidence or fail to confirm it. If the fraud hypothesis is confirmed at the higher confidence level, either at step 218 or by the confirmation component, at step 226, the mobile communications device is classified as a fraudulent source for the purposes of destination fraudulence evaluation, as discussed elsewhere. After this, or if the fraud hypothesis could not be confirmed at step 224, processing terminates.

To provide a concrete example of this method, consider again FIG. 1. For the purposes of this example, the fraud hypothesis variable will be initialized to 0, and will be modified by adding the fraud metric value associated with the destination identifier. The first threshold will be 0.5 and the second threshold will be 1. Other embodiments have different values for these parameters. For the purposes of this example, we assume that prefixes matching each destination identifier shown are present in the prefix list. Thus the fraud hypothesis variable associated with mobile device 102 will be initialized to 0, and will be modified to become −0.5, −0.6, and −0.5 as the call records associated with destination identifiers 108, 110, and 112 are processed in turn and the respective fraud values added to the fraud hypothesis variable. As this does not satisfy the fraud hypothesis even at the lower confidence level, processing will terminate after step 214.

Considering now mobile device 104, the associated fraud hypothesis variable will begin at 0, and be modified to −0.1, 0, and then 0.5 as communications records associated with destination identifiers 110, 112, and 114 are processed. Since this value confirms the fraud hypothesis at the lower confidence level, a fraud alert will be generated at step 216, but since it does not confirm the fraud hypothesis at the higher level, it will be passed to the confirmation component for further processing. Classification as a fraudulent source will depend on the result of this classification.

Considering now mobile device 106, the associated fraud hypothesis variable will begin at 0, and be modified to 0.1, 0.6, and 1.1 as the communications records associated with destination identifiers 112, 114, and 116 are processed. This confirms the fraud hypothesis variable at the lower level, so a fraud alert is generated, and also at the higher level, so mobile communications device 106 is classified as a fraudulent source for the purposes of destination fraudulence evaluation.

Figure 3:
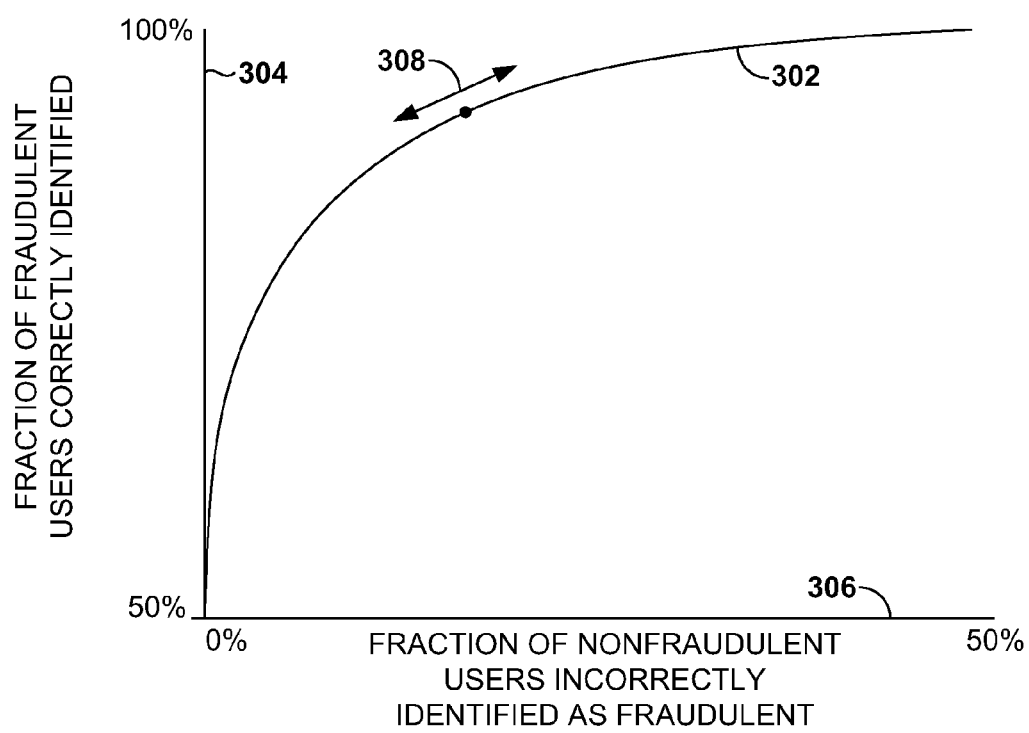
FIG. 3 depicts a graph showing the trade-off between a high true positive rate and a low false positive rate when detecting fraud.

Turning now to FIG. 3, a graph showing the trade-off between a true positive rate and a false positive rate when detecting fraud is depicted for an exemplary data set. Curve 302 plots the fraction of fraudulent users correctly identified 304 (i.e., true positives) against the fraction of nonfraudulent users incorrectly identified as fraudulent 306 (i.e., false positives). Each point such as point 308 corresponds to a particular value for the first threshold $T_1$. Thus it is clear that correctly identifying a very large fraction of fraudulent users (a very high true positive (TP) rate) may come at the cost of incorrectly identifying too large a fraction of nonfraudulent users as fraudulent (an unacceptably high false positive (FP) rate). For example, point 308 has a TP rate of approximately 95%, but only at the cost of an FP rate of approximately 20%. Since a high FP rate can adversely affect customer satisfaction, a low FP rate is desirable along with a high TP rate.

To quantify this idea, the idea of precision is used, where $$\text{precision} = \frac{TP}{TP + FP}$$

Thus, point 308 has a precision of approximately 0.83. A precision value that is too low indicates that too many false positives are being generated, and that the threshold is correspondingly too low. Similarly, a precision rate that is too high means that it is likely that the false negative rate (i.e., fraudulent users who are incorrectly identified as non-fraudulent) is too high. For this reason, some embodiments of method 200 may incorporate the additional steps of obtaining feedback on fraud alerts and adjusting the threshold to keep the precision between an upper bound and a lower bound. This process will move operating point 308 along curve 302: increasing the threshold will move operating point to the left, while decreasing the threshold will move operating point 308 to the right. In one embodiment, the upper bound is 0.9 and the lower bound is 0.8. Other embodiments may have other values for the upper bound and lower bound without departing from the scope of the claims below.

Figure 4:
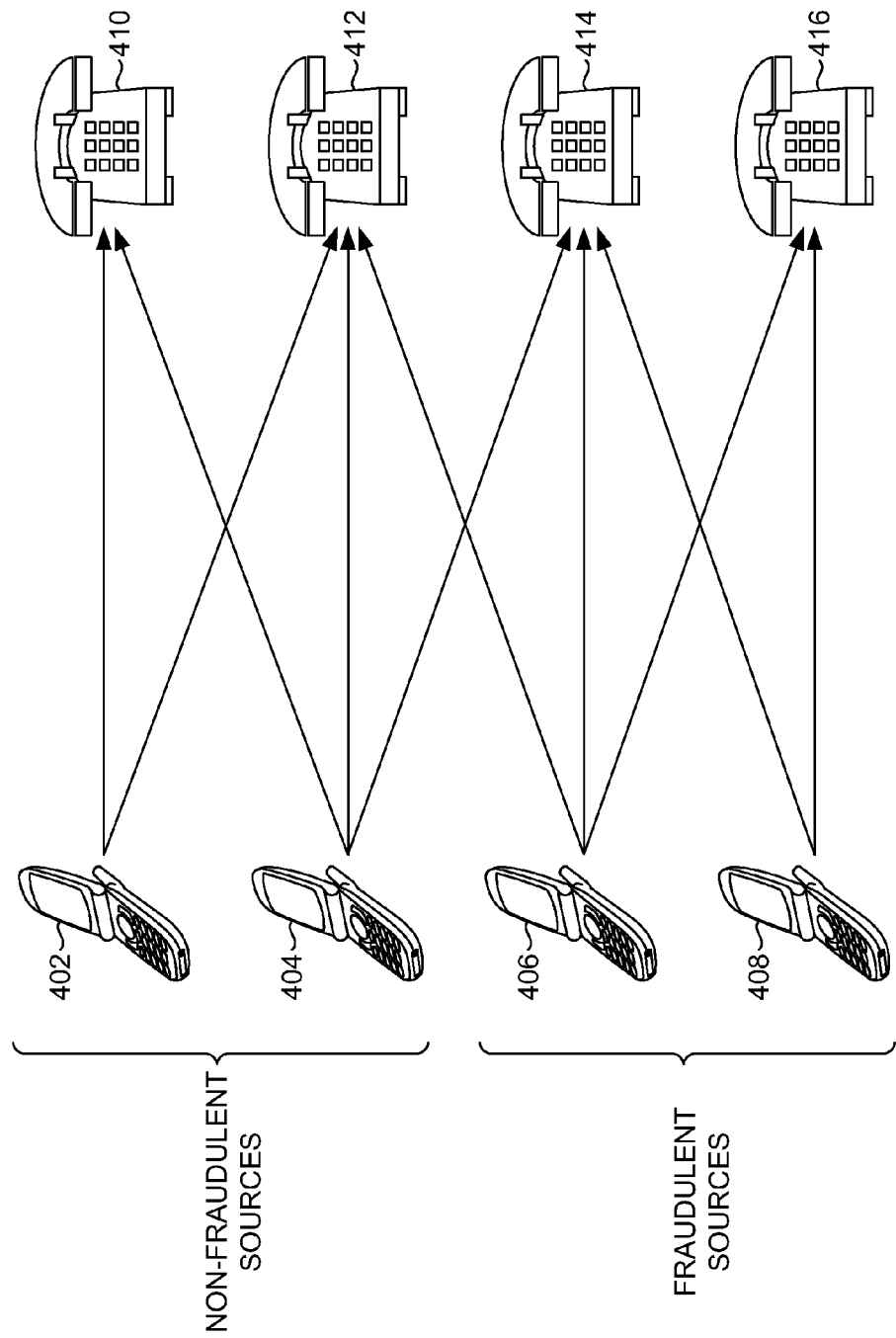
FIG. 4 depicts an illustrative diagram showing the source identifiers associated with certain destination identifiers in accordance with a second embodiment of the present invention.

Turning now to FIG. 4, an illustrative diagram showing the source identifiers associated with certain destination identifiers in accordance with a second embodiment of the present invention is presented. Nonfraudulent sources 402 and 404 are similar to mobile communications device 102 in FIG. 1A; fraudulent sources 406 and 408 are similar to mobile communications device 106 in FIG. 1A. Destination identifiers 410, 412, 414, and 416 are similar to destination identifiers 108, 110, 112, 114, and 116, but do not necessarily correspond directly. Destination identifier 410 has been connected to by non-fraudulent sources 402 and 404. Destination identifier 412 has been connected to by non-fraudulent sources 402 and 404, and by fraudulent source 406. Destination identifier 414 has been connected to by nonfraudulent source 404 and fraudulent sources 406 and 408. Destination identifier 416 has been connected to by only fraudulent sources 406 and 408.

As in FIG. 1A, in some embodiments, each communication initiated by a mobile communications device to a given destination identifier is recorded separately; in other embodiments, only the fact that, e.g., mobile communications device 402 initiated communication with destination identifier 410 at least once is significant.

Figure 5:
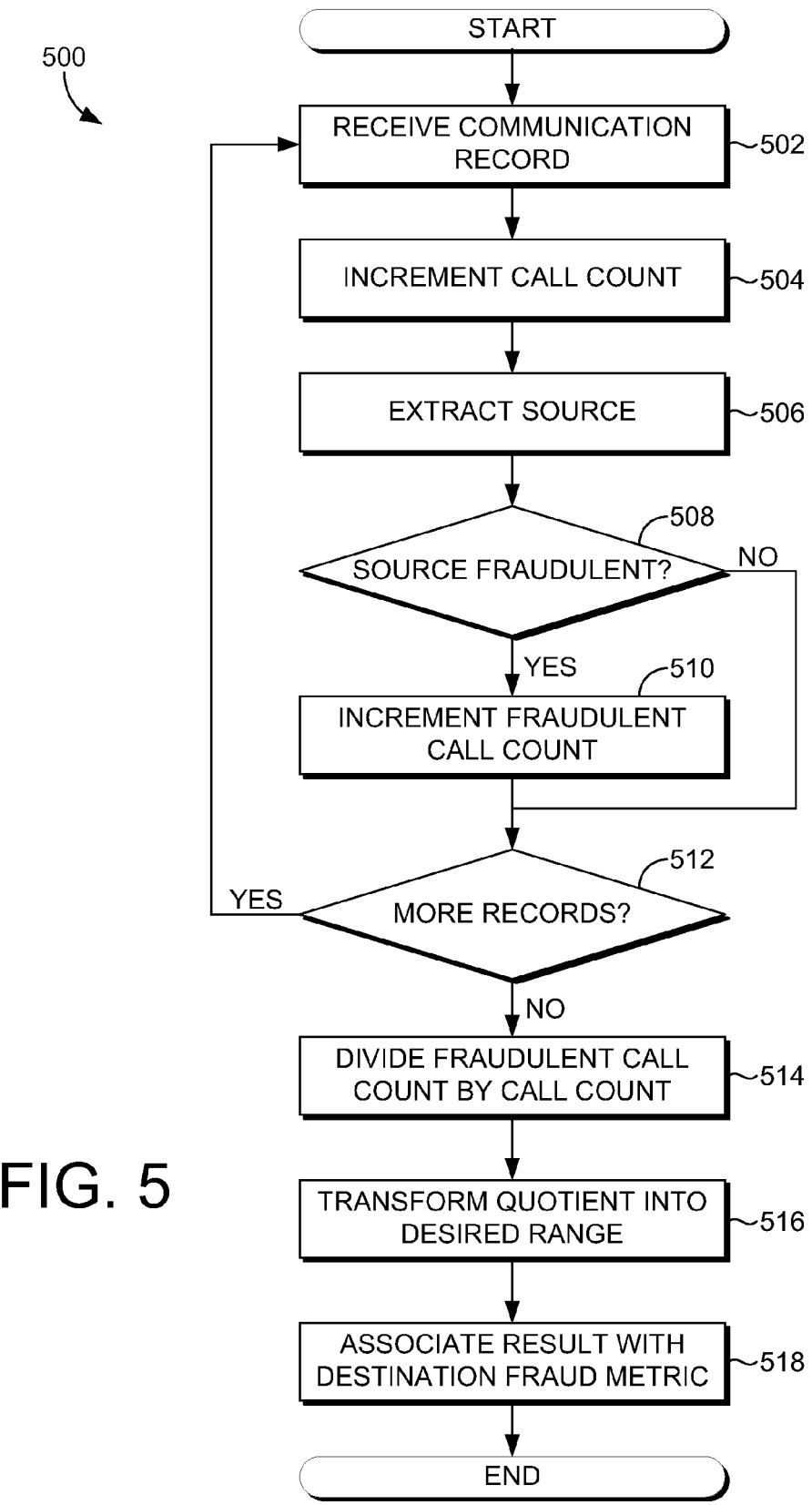
FIG. 5 depicts a flowchart for a method of detecting fraudulent destinations in accordance with one embodiment of another aspect of the present invention.

Turning now to FIG. 5, a flowchart for a method of detecting fraudulent destinations in accordance with one embodiment of the present invention is presented and referred to generally by reference numeral 500. At step 502, a communications record (such as communications record 118) associated with a destination identifier to be evaluated (such as destination identifier 122) is received. In various embodiments, this communications record will take different forms: in one embodiment, this communications record takes the form of a call record. In another embodiment, it takes the form of an SMS message. In a third embodiment, it takes the form of an indication of a data communication. Each communication record so received is related to activity that took place over a given period of time; in one embodiment, this period of time may correspond to a billing cycle; in another embodiment, this period of time corresponds to the previous month. Other time intervals are possible without departing from the scope of the claims below. In some embodiments, this time interval will differ from the time interval used in method 200.

At step 504, a count of all communications records so received is incremented, and at step 506, a source identifier such as source identifier 120 is extracted from the communications record. As in step 206 of method 200, the form this source identifier takes depends on the form of communications record 118. In one embodiment, source identifier 120 takes the form of a ten-digit phone number when communications record 118 is a phone call. In another embodiment, it takes the form of an ESN.

At step 508, it is determined whether the source identifier 120 obtained in step 506 corresponds to a fraudulent source. In some embodiments, this was previously determined via method 200, and the resulting classification stored for the current use. In other embodiments, this determination is made on the fly via method 200. In still other embodiments, this determination is made via other means. Other methods of making this determination are possible without departing from the scope of the claims below.

If the source corresponding to source identifier 120 is determined to be fraudulent, a count of fraudulent communications records is incremented at step 510; in either case, execution then proceeds to step 512. At step 512, it is determined whether more communications records 118 remain that are associated with the destination identifier being evaluated and the time period in question. If so, steps 502 et seq., are repeated.

Once no communications records 118 associated with the destination identifier being evaluated and the time period in question remain, execution proceeds to step 514. At this step, the count of communications records and the count of fraudulent communications records are used to generate a raw value for the fraudulence of the destination. In one embodiment, this is accomplished by dividing the count of fraudulent communications records by the count of all communications records. In another embodiment, this is accomplished by using the unaltered count of fraudulent communications records. Other methods of generating the raw value for the fraudulence of the destination identifier are possible without departing from the scope of the claims below.

At step 516, this raw result is mapped into a desired range. In some embodiments, this is accomplished by means of an affine transform. In an exemplary embodiment, the raw result is the result of the fraction of all communications records that come from fraudulent sources (as described above), and the desired range is [−½, ½]. The transformation in this case is simply subtracting one-half. In another example, the raw result still falls between 0 and 1, but the desired range is [−1,1]. In this case, the transformation is multiplying by 2 followed by subtracting 1. In yet another example, the range of raw results and the desired range coincide; in this case, the identity transformation (i.e., making no change) is used. Other transformations are possible without departing from the scope of the claims below. Finally, at step 518, the result of this transformation is associated with the destination to obtain the destination fraud metric.

As a concrete example, consider again FIG. 4. Destination identifier 410 has been connected to by two nonfraudulent sources and zero fraudulent sources. Assuming the desired range for fraud metric values is [−½, ½], as described above, the raw result is 0, and the fraudulence value is −0.5. Similarly, destination identifier 412 has been connected to by two nonfraudulent sources and one fraudulent source giving a raw result of 0.33, and a fraudulence value of −0.17.

Figure 6:
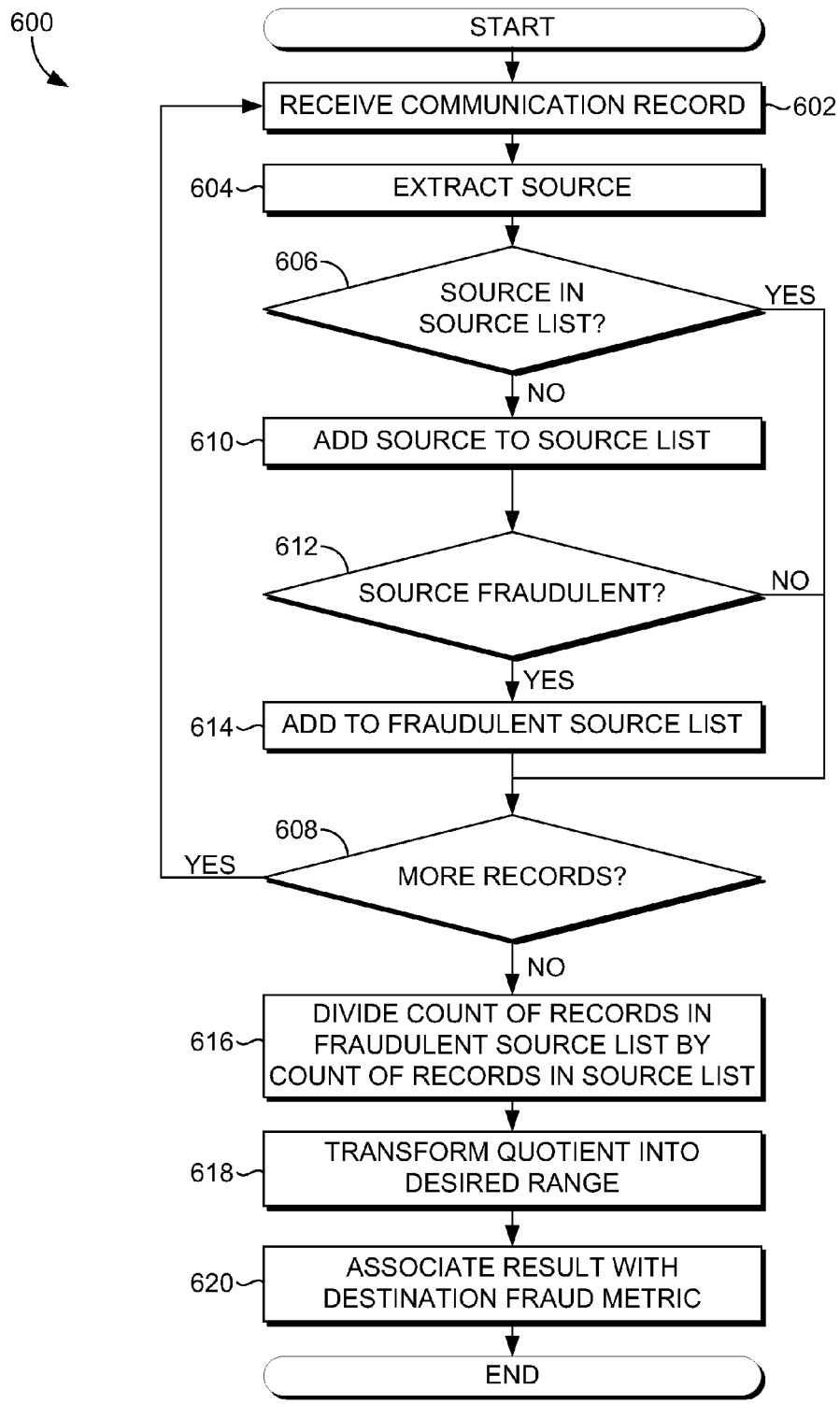
FIG. 6 depicts a flowchart for an alternate method of detecting fraudulent destinations in accordance with a second embodiment of this aspect of the present invention.

Turning now to FIG. 6, a flowchart for a method of detecting fraudulent destinations in accordance with an alternate embodiment of the present invention is presented and referred to generally by reference numeral 600. Many of the steps in method 600 correspond to those in method 500. Step 602 corresponds to step 502. Step 604 corresponds to step 506. At step 606, a list of source identifiers previously observed to connect to the destination identifier 122 being evaluated is consulted to see if the source identifier 120 has been previously observed to connect to destination identifier 122. If so, execution proceeds to step 608, which corresponds to step 512. Otherwise, source identifier 120 is added to the source list at step 610. At step 612, corresponding to step 508 of method 500, it is determined whether source identifier 120 is associated with a fraudulent source. If so, source identifier 120 is added to the list of fraudulent sources that have been observed to connect to the destination identifier. In either case, execution then proceeds to step 608.

At step 616, the number of distinct sources observed to connect to the destination identifier and the number of distinct fraudulent sources observed to connect to the destination identifier are used to generate a raw fraudulence value for the destination identifier being evaluated. This is similar to step 514 of method 500, but counts each source only once, regardless of the number of times the source connects to the destination identifier being evaluated. At step 618, corresponding to step 516, this raw value is transformed into the desired range. Finally, at step 620, corresponding to step 518, the result of this transformation is associated with the destination to obtain the destination fraud metric.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed, perform a method of detecting fraud, the method comprising:
  initializing a fraud hypothesis variable associated with a communications device;
  receiving data that describes a plurality of outgoing communication records that are associated with said communications device, wherein the data is related to activity that took place over a given period of time;
  extracting a plurality of destination identifiers from said plurality of communication records;
  for each destination identifier of a portion of said plurality of destination identifiers, obtaining a fraud metric associated with the destination identifier, wherein the fraud metric is based at least in part on an amount of fraudulent communications associated with the destination identifier;
  for each destination identifier of the portion of said plurality of destination identifiers, modifying said fraud hypothesis variable associated with the communications device based on the fraud metric associated with said destination identifier;
  comparing said fraud hypothesis variable to a first predetermined threshold; and
  when said fraud hypothesis variable exceeds said first predetermined threshold, generating a fraud indication that is related to said communications device.

2. The media of claim 1, wherein the fraud hypothesis variable is initialized such that no fraud indication is generated for a communications device with no associated communications records.

3. The media of claim 1, wherein the portion of the plurality of destination identifiers consists of those destination identifiers associated with one or more specified area codes.

4. The media of claim 1, wherein the portion of the plurality of destination identifiers consists of those destination identifiers associated with one or more specified international country codes.

5. The media of claim 1, wherein modifying said fraud hypothesis variable comprises adding said fraud metric to said fraud hypothesis variable.

6. The media of claim 5, wherein the fraud metric is constrained to have an absolute value less than or equal to one-half.

7. The media of claim 1, wherein the first predetermined threshold is at least three.

8. The media of claim 1, the method further comprising:
comparing said fraud hypothesis variable to a second predetermined threshold, wherein said second predetermined threshold is greater than said first predetermined threshold;
when said fraud hypothesis variable exceeds said second predetermined threshold, causing the communications device to be classified as a fraudulent source when calculating a destination fraud metric.

9. The media of claim 8, the method further comprising:
when said fraud hypothesis variable is greater than said first predetermined threshold but less than said second predetermined threshold, causing said fraud indication to be verified by other means; and
when said other means confirm the fraud indication, causing the communications device to be classified as a fraudulent source when calculating a destination fraud metric.

10. The media of claim 1, the method further comprising
receiving feedback regarding the fraud indication and updating one of
(A) a false positive counter; and
(B) a true positive counter;
based on said feedback;
calculating a precision value associated with the first predetermined threshold;
comparing said precision value to a target precision range;
when said precision value is below said target precision range, increasing said first predetermined threshold; and
when said precision value is above said target precision range, decreasing said predetermined threshold.

11. The media of claim 10, wherein the target precision range is 0.8-0.9.

12. One or more nontransitory computer-readable media having computer-executable instructions embodied thereon that, when executed, perform a method of detecting fraud, the method comprising:
receiving data that describes a plurality of communication records that are associated with a destination identifier, wherein the destination identifier is associated with a communication device, and wherein the data is related to activity that took place over a given period of time;
extracting a plurality of source identifiers from said plurality of communication records, wherein each source identifier identifies a source of a communication received by the communication device;
for each of said source identifiers, determining whether said source identifier is classified as fraudulent or non-fraudulent;
based on a number of fraudulent source identifiers and a number of nonfraudulent source identifiers, calculating a fraud metric associated with the destination identifier.

13. The media of claim 12, wherein calculating the fraud metric comprises:
dividing a count of communication records associated with fraudulent source identifiers by a count of all communication records to obtain a result; and
applying a transformation to map the result onto a desired interval.

14. The media of claim 12, wherein calculating the fraud metric comprises:
dividing a count of distinct fraudulent source identifiers associated with said communication records by a count of all distinct source identifiers associated with said communication records to obtain a result; and
applying a transformation to map the result onto a desired interval.

15. A system for detecting fraud, comprising:
a device classification component that performs a method comprising:
(A) receiving a first data set that describes a plurality of communication outgoing records that are associated with a communications device, wherein the data is related to activity that took place over a first period of time;
(B) extracting a plurality of destination identifiers from said plurality of outgoing communication records;
(C) initializing a fraud hypothesis variable associated with said communications device;
(D) for each destination identifier of a portion of said plurality of destination identifiers, obtaining from a destination classification component a fraud metric associated with the destination identifier, wherein the fraud metric is based at least in part on an amount of fraudulent communications associated with the destination identifier;
(E) for each destination identifier of the portion of said plurality of destination identifiers, modifying said fraud hypothesis variable associated with said communications device based on the fraud metric associated with said destination identifier; and
(F) comparing said fraud hypothesis variable to a first predetermined threshold;
(G) when said fraud hypothesis variable exceeds said first predetermined threshold, generating a fraud indication that is related to said communications device; and
(H) passing said fraud indication to a confirmation component;
the destination classification component that performs a method comprising:
(A) receiving a second data set that describes a plurality of communication records that are associated with a potentially fraudulent destination identifier, wherein the data set is related to activity that took place over a second period of time;
(B) extracting a plurality of source identifiers from said plurality of communication records;
(C) for each source identifier of said plurality of source identifiers, determining whether said source identifier has been classified as fraudulent or non-fraudulent by the device classification component and confirmed as fraudulent by the confirmation component;

(D) based on a number of source identifiers that have been classified as fraudulent and a number of source identifiers that have been classified as non-fraudulent, calculating a fraud metric associated with the destination identifier; and (E) passing the fraud metric to the device classification component upon request; and a confirmation component that performs a method comprising:

(A) receiving fraud indications from the device classification component;

(B) for each fraud indication so received, determining whether said fraud indication requires corroboration;

(C) if said fraud indication requires corroboration, performing additional analysis to classify a device associated with the fraud indication as fraudulent or non-fraudulent;

(D) if said fraud indication does not require corroboration, classifying the device associated with the fraud indication as fraudulent;

(E) passing a result of said classifying to the destination classification component upon request.

16. The system of claim 15, wherein the first period of time is shorter than the second period of time.

17. The system of claim 15, wherein the portion of the destination identifiers for which fraud metrics are received by the device classification component from the destination classification component consists of those destination identifiers associated with one or more specified area codes.

18. The system of claim 15, wherein the portion of the destination identifiers for which fraud metrics are received by the device classification component from the destination classification component consists of those destination identifiers associated with one or more specified international country codes.

19. The system of claim 15, wherein:

the portion of the destination identifiers for which fraud metrics are received by the device classification component from the destination classification component consists of those destination identifiers that have a prefix that is included in a list of prefixes associated with fraudulent activity; and said list of prefixes associated with fraudulent activity is updated based at least in part on one or more destination identifiers associated with communications devices that are classified as fraudulent by the device classification component.

20. The system of claim 15, wherein the confirmation component performing additional analysis comprises passing data related to said communication device to a human for review and receiving a classification as fraudulent or non-fraudulent in reply.

* * * * *